United States Patent [19]
Venturi et al.

[11] Patent Number: 5,363,819
[45] Date of Patent: Nov. 15, 1994

[54] PNEUMATIC-INJECTION TWO-STROKE ENGINE WITH FIRST ORDER BALANCING OF THE RECIPROCATING MASSES

[75] Inventors: Stéphane Venturi, Choisy Le Roi; Pierre Duret, Sartrouville, both of France

[73] Assignee: Institut Francais Du Petrole, Rueil Malmaison, France

[21] Appl. No.: 118,644

[22] Filed: Sep. 10, 1993

[30] Foreign Application Priority Data

Sep. 11, 1992 [FR] France .................................. 9210869

[51] Int. Cl.$^5$ ............................................ F02B 75/06
[52] U.S. Cl. ............................. 123/192.2; 123/90.27; 123/65 A
[58] Field of Search ............... 123/192.2, 90.27, 90.31, 123/531, 65 A

[56] References Cited

U.S. PATENT DOCUMENTS

| | | | |
|---|---|---|---|
| 3,203,274 | 8/1965 | Barth | 74/604 |
| 5,215,064 | 6/1993 | Monnier et al. | 123/67 |

FOREIGN PATENT DOCUMENTS

| | | |
|---|---|---|
| 2288251 | 9/1975 | France . |
| 2376946 | 5/1977 | France . |
| 2558232 | 10/1985 | France . |
| 2623854 | 11/1987 | France . |
| 2096705 | 3/1982 | United Kingdom . |
| WO 87/00580 | 1/1987 | WIPO . |

*Primary Examiner*—Noah P. Kamen
*Attorney, Agent, or Firm*—Antonelli, Terry, Stout & Kraus

[57] ABSTRACT

A two-stroke engine comprising a crankshaft rotating around a first axis of rotation and having at least one balancing mass, a controller for controlling feeding of at least one combustion chamber of the engine. A second shaft is rotatable around a second axis of rotation parallel to the first axis of rotation and is rotatably driven by the crankshaft. At least one balancing mass is connected in rotation to the controller so as to achieve a first order balancing of the reciprocating masses of the engine. A pneumatic fuel injection system, utilizing a portion of an air charge of the engine, sprays fuel into the combustion chamber at predetermined times of a working cycle, and a counter rotating drive of the pneumatic injection controller means by the crankshaft is achieved by a two-space toothed belt.

6 Claims, 1 Drawing Sheet

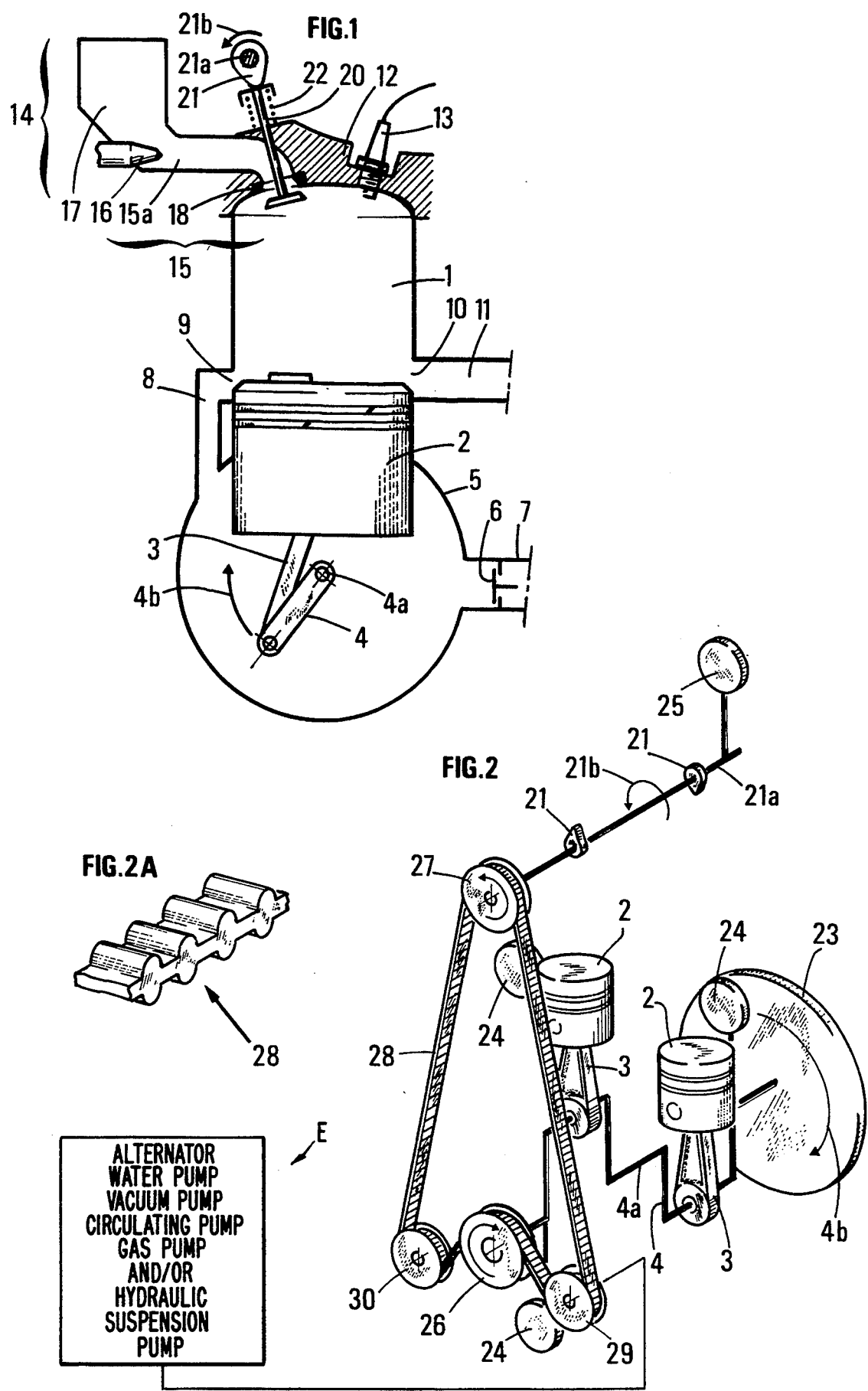

PNEUMATIC-INJECTION TWO-STROKE ENGINE WITH FIRST ORDER BALANCING OF THE RECIPROCATING MASSES

FIELD OF THE INVENTION

The present invention relates to a controlled pneumatic-injection two-stroke engine comprising an arrangement for achieving a first order mass balancing of reciprocating or vibratory masses of the engine.

BACKGROUND OF THE INVENTION

Two-stroke engines with one or more cylinders generally include, associated with each of the cylinders, a crankcase, called a pump crankcase, communicating with one end of the combustion chamber of the cylinder and providing introduction of a fresh gas into the cylinder, by at least one line and a transfer opening. The piston, which moves in a reciprocating motion in the cylinder, also ensures a suction and a compression of the fresh gases in the pump crankcase. An intake valve, arranged on the pump crankcase, allows introduction of the fresh gases into the crankcase when the piston moves in the opposite direction of the crankcase, with these fresh gases being thereafter compressed and ensuring a closing of the intake valve, when the piston moves in the direction of the crankcase. When the corresponding openings of the cylinder are uncovered by the piston, fresh gases are introduced into the cylinder through the lines and the transfer openings and they generate a fresh gas scavenging intended to replace the waste gases which are discharged through exhaust openings generally offset with respect to the transfer openings. The piston moves away from the crankcase so as to compress the gases contained in the cylinder. The ignition and the combustion of the mixture of air and fuel thereafter generate the motive displacement of the piston towards the crankcase.

Two stroke engines with one or more cylinders are particularly known which comprise, associated with each of the cylinders, a device for a pneumatic injection of fuel providing spraying of a liquid fuel by a gas under pressure which is generally compressed air, and an introduction of the carburetted mixture obtained into the engine cylinder. Feeding and scavenging of the cylinder with fresh air is then achieved independently of the pneumatic injection of the fuel which is triggered at a predetermined time of the working cycle of the engine.

More particularly, the fuel pneumatic injection device may include a chamber which may be communicated with the inner chamber of the cylinder by a specific device, hereinafter referred to as a pneumatic injection control device. The pneumatic injection control device for each cylinder may, for example, include an automatic valve, a controlled valve, or a rotary plug.

In this type of pneumatic injection, the gas under pressure may be supplied from either an auxiliary tank or a part of the engine producing gas under pressure.

It has been proposed to supply compressed air to the pneumatic injection control device from a capacity of accumulator, which capacity or accumulator is reloaded by the pump crankcase so as to ensure a fresh air feed and scavenging of the engine cylinder.

Engines having characteristics outlined hereinabove are proposed in, for example, FR-2,623,854 and FR-2,656,636.

The subject matter of the present invention is particularly applied to the engine type described above and relates to the first order balancing of reciprocating or vibrating masses of the engine.

FR-2,558,232 proposes an internal combustion engine in which the first order balancing of the forces generated by the reciprocating or vibrating masses of the engine is achieved by additional masses connected in rotation to the cam shaft driven in rotation by the crankcase and by additional masses connected in rotation to the crankcase.

Those skilled in the art are aware that the first order balancing of an engine requires a shaft, other than the crankcase, to be rotated at the same speed in the opposite direction of the crankcase.

SUMMARY OF THE INVENTION

The present invention proposes a solution to the problem of first order balancing of engines of the type described hereinabove.

With regard to the prior art, the present invention most notably relates to FR-2,558,232, with the aim of the present invention being a solution which is simpler, less costly and more reliable in operation.

The present invention provides no gear system serving as a drive system and, consequently, the lubrication, normally associated with geared systems, is not required.

Furthermore, according to the present invention, the wear of the parts or elements set into motion is very low and the assembly is considerably more quite during operation.

Moreover, the presence of return pulleys may be advantageously used for driving other elements which may or not be linked to the running or operation of the engine.

In order to achieve the aims noted above, the present invention relates to a two-stroke engine comprising a crankcase rotating around a first axis of rotation and having at least one balancing mass. Means are provided for controlling a feeding of at least one combustion chamber, with a second shaft, forming a cam shaft, rotating around a second axis of rotation parallel to the first axis of rotation and driven in rotation by the crankcase. At least one balancing mass is connected in rotation to the feed control means so as to achieve a first order balancing of the reciprocating masses of the engine.

The engine of the present invention may comprise a system for a pneumatic injection of fuel utilizing a portion of an air charge to spray the fuel into the combustion chamber at predetermined times of the working cycle, and with the counter rotating drive of the pneumatic injection control means by the crankshaft being achieved by a two-face toothed belt.

Moreover, the engine may comprise at least two return pulleys driven by the belt, with the axis of rotation of the pulleys being parallel to the axis of rotation of the crankcase.

Advantageously, at least one of the return pulleys may be adapted to rotatably drive other subassemblies and/or elements whether or not the subassemblies and/or elements are linked to the running of the engine.

Preferably, at least one of the other elements driven by at least one of the return pulleys may include at least one of an alternator, a water pump, a vacuum pump or a gas pump.

BRIEF DESCRIPTION OF THE DRAWINGS

Other features and advantages of the present invention will become clear from a reading of the description hereinbelow, given by way of non-limitative examples, with reference to the accompanying drawings wherein:

FIG. 1 is a schematic longitudinal partial cross-sectional view of an engine constructed in accordance with the present invention;

FIG. 2 is a schematic view of a drive of the cam shaft by the crankcase in accordance with the present invention; and FIG. 2A is a perspective detail view of a portion of the transmission belt used in conjunction with the present invention.

DESCRIPTION OF THE PREFERRED EMBODIMENT

As shown in FIG. 1, a two-stroke engine in accordance with the present invention includes a cylinder 1 in which a piston 2, connected by a piston rod 3 to a crankcase 4, moves in a reciprocating motion or manner. The cylinder 1 communicates through a lower open part thereof with a pump crankcase 5 which the piston 2 may enter partially while moving toward a bottom dead center position of the piston as shown in FIG. 1. The crankcase 5 comprises an air supply pipe 7 with a valve 6 being provided for controlling the opening and closing of the air supply pipe 7. The piston, while moving toward a bottom dead center position thereof, compresses the air contained in the crankcase 5 to drive the air back into the lines 8 opening through transfer ports 9 into the chamber of the cylinder 1. The scavenging of the cylinder by fresh air is thus ensured by the crankcase 5 and lines 8 when the piston 2 uncovers the port 9 by moving in a downward direction.

An exhaust line 11 communicates with the combustion chamber of the cylinder 1 through exhaust ports 10, with the exhaust port 10 being slightly offset with respect to a position of the transfer ports 9, as viewed in the direction of travel of the piston 2, so that the piston 2, while moving in a downward direction, first uncovers the exhaust ports 10 and then the transfer ports 9 so as to ensure the scavenging of the cylinder 1 with fresh air, with the waste gases being discharged through the exhaust ports 10.

The cylinder 1 is closed at an upper part thereof by a cylinder head 12 in which an ignition plug 13 is fastened and by an assembly 14 including a pneumatic injection device 15 and a capacity of accumulator 17.

The pneumatic injection device, which may be referred to as a pneumatic injector 15, comprises a fuel injector 16 for supplying liquid fuel to a chamber 15a of the pneumatic injector 15. The pneumatic injector 15 may include a chamber 15a provided inside the cylinder head 10, with the chamber 15a opening into the upper part of the cylinder 1 at a level of a valve seat 18 and a valve 20. The valve 20 is provided with a valve stem of spindle an end of which is in contact with an actuating cam 21 provided on the cam shaft 21a.

The valve 20 cooperates with the valve seat 18 to ensure opening or closing of the pneumatic injector 15 through the action of the cam 21, on the cam shaft 21a, and a return spring 22.

There must therefore be a direct relationship between the movement of the piston 2 and the movement of the valve 20. More precisely, as indicated by the arrows 4B and 21b in FIG. 2, the crankshaft 4 and the cam 21 rotate in opposite directions and at the same speed. The crankshaft 4 is fastened to an axle 4a and the cams 21 are fastened to the camshaft 21a.

FIG. 2 schematically illustrates a connection between the crankshaft 4 and camshaft 21a with a two-cylinder engine.

According to FIG. 2, the crankshaft 4 is driven by two pistons 2 and the crankshaft 3 drives the camshaft 21a by way of a device described more fully hereinbelow. The specific details and particular purpose of the cams 21 of the cam shaft 21a, namely, the control of the opening of the valves 20, is well known to the skilled artisan and will note be described in further detail.

However, it is nevertheless essential, for an understanding of the present invention, to explain more precisely the dynamic balancing necessary to prevent engine oscillation. More precisely, it is necessary to elaborate on the manner by which the reciprocating masses of the engine are to be balanced.

The crankshaft 4 includes an inertia flywheel 23 at one end thereof and, in the embodiment of FIG. 2, two or more counterweights 24 may be provided to allow for balancing of the crankshaft 4. Additionally, at a level of the camshaft 21a, two or more other masses are fastened thereto so as to balance the engine dynamically.

As noted above, the first order dynamic balancing of an engine requires a rotating shaft other than the crankshaft to rotate in a direction opposite the rotation of the crankshaft. This balancing is preferably achieved by fastening one or more balancing weights onto the camshaft 21a.

Advantageously, the camshaft 21a fulfills two functions; namely, a rotation of the cams 21 controlling the opening and closing of the valves 18, and a first order balancing of forces generated by the vibrating masses of the engine.

According to the present invention, a transmission movement between the crankshaft 4 and the camshaft 21a is achieved through the system described below.

A first or driving pulley 26 is fastened to one end of the axial 4a of the crankshaft 4. A second pulley 27 is fastened to one end of the camshaft 21a. The two pulleys 26, 27 rotate in opposite directions by a double-toothed belt 28 passing successively on the driving pulley 26, on a first return pulley 29, on pulley 27 and then on a second return pulley 30. The pulleys 26, 27, 29 and 30 are, of course, disposed in the same plane and the belt 28, toothed on two faces thereof, allows, through a simple reliable and inexpensive layout, a counter rotating transmission between the driving pulley 26 connected to the crankshaft 4 and the pulley 27 of the camshaft 21a to be obtained.

All of the components of the transmission, for example, all of the pulleys 26, 27, 28, 29 and 30, being in the same plane, allows a smaller overall dimension than possible in the prior art.

FIG. 2A provides an enlarged detail view of the double-toothed belts 28 which may, for example, include, as is conventional, a metallic, braided or the like frame embedded in a rubber having a toothed profile on both faces of the belt 28.

Without departing from the scope of the present invention, the camshaft 21a associated with the valve(s) 20 may be replaced by an axle to which one or several rotary plugs for filling the same purpose as the valves 18 above, that is pneumatic injection control. The rotary plugs may be fastened to the axle and form means for opening/closing of a carbureted mixture feed into the combustion chamber of the engine.

Furthermore, at least one of the return pulleys 29, 30 may be advantageously used for rotatably driving other elements generally designated by the reference character E (FIG. 2) linked or not linked to the specific running of the engine. The other elements E may, for example be an alternator, a water pump, a vacuum pump (used for braking) a circulating pump, a hydraulic suspension pump, or a gas pump driven by one of the return pulleys 29, 30.

The present invention is more specifically applied to a pneumatic-injection two-stroke engine in which a portion of the air charge is used to achieve the pneumatic injection while the other portion of the air charge is introduced into the cylinder 1 by at least one port 9 and covered by the piston 2. Additionally, the piston 2 uncovers at least one other port, namely, the exhaust port 10.

Of course, the system which has been described above may be provided with other additions and/or modifications by the skilled artisan without departing from the scope of the present invention.

We claim:

1. A two-stroke engine comprising a crankshaft rotatable around a first axis of rotation and having at least one balancing mass, a system for pneumatic injection of fuel utilizing a portion of an air charge of the engine to spray fuel into at least one combustion chamber of the engine at predetermined times of a working cycle of the engine, means for controlling a feeding of fuel by the pneumatic injection system including a second shaft rotatable around a second axis of rotation parallel to said first axis of rotation and driven in rotation by the crankshaft, at least one balancing mass connected in rotation to said feeding controlling means so as to achieve a first order balancing of reciprocating masses of the engine, and a two-faced toothed belt for providing a counter rotating drive of the feeding controlling means by said crankshaft.

2. An engine as claimed in claim 1, further comprising at least two return pulleys driven by said belt, said at least two return pulleys having a respective axis of rotation parallel to the first axis of rotation of the crankshaft.

3. An engine as claimed in claim 2, wherein an axle of at least one of the return pulleys is adapted to rotatably drive other elements associated with the engine.

4. An engine as claimed in claim 3, wherein at least one of the other elements driven by at least one of said return pulleys is at least one of an alternator, a water pump, a vacuum pump, a circulating pump, a hydraulic suspension pump or a gas pump.

5. An engine as claimed in one of claims 1, 2, 3 or 4, wherein a remaining portion of the air charge is introduced through at least one port uncovered by a piston of the engine.

6. An engine as claimed in one of claims 1, 2, 3, or 4, wherein an exhaust of the engine is achieved through at least one port uncovered by a piston of the engine.

* * * * *